United States Patent [19]

Brownscombe et al.

[11] 4,451,633
[45] May 29, 1984

[54] OLEFIN POLYMERIZATION

[75] Inventors: Thomas F. Brownscombe; Carl L. Willis, both of Houston, Tex.

[73] Assignee: Shell Oil Company, Houston, Tex.

[21] Appl. No.: 409,744

[22] Filed: Aug. 19, 1982

[51] Int. Cl.³ ............................................... C08F 2/02
[52] U.S. Cl. .............................. 526/348.6; 264/328.1; 264/331.17; 526/159; 521/119
[58] Field of Search .................. 264/22, 236, 347, 2.2, 264/272.13, 331.17; 526/347, 347.2, 348.2, 348.3, 348.4, 348.5, 348.6

[56] References Cited

U.S. PATENT DOCUMENTS

| | | | |
|---|---|---|---|
| 2,328,333 | 8/1943 | Freeman | 264/331.17 |
| 2,665,452 | 1/1954 | Beattie | 264/331.17 |
| 2,912,418 | 11/1959 | Johnson | 264/236 |
| 3,414,553 | 12/1968 | Kern | 526/347.2 |
| 3,794,451 | 2/1974 | Breer et al. | 425/4 |
| 3,853,446 | 12/1974 | Hostettler et al. | 425/217 |
| 3,908,862 | 9/1975 | Chandra et al. | 222/63 |
| 3,975,128 | 8/1976 | Schluter | 425/207 |
| 4,020,021 | 4/1977 | Lahouste et al. | 260/2.5 |
| 4,058,654 | 11/1977 | Sutter et al. | 526/159 |
| 4,150,074 | 4/1979 | Tilgner | 264/40.7 |

FOREIGN PATENT DOCUMENTS 47-42377 10/1972 Japan.
47-42378 10/1972 Japan.
48-39836 11/1973 Japan.
49-104958 10/1974 Japan.

OTHER PUBLICATIONS

Reaction Injection Molding, Ed. W. E. Becker, Van Nostrand Reinhold Co., 1979.
Introduction to Reaction Injection Molding, F. M. Sweeney, Technomic Publishing Co., 1979, (a) Only Abstracts of References AL–AO available.

Primary Examiner—Paul R. Michl
Attorney, Agent, or Firm—Dean F. Vance

[57] ABSTRACT

Completely polymerizing olefinic monomer feed, in contact with a coordination catalyst suitable for olefin polymerization, in a mold having the shape of the article, at conditions under which the polymer is produced as a coherent, useful article in the shape of the interior of the mold, and removing the article from the mold. This method permits the production of polyolefin articles which are difficult or impossible to produce from polyolefin powder or pellets by conventional methods, such as articles of polyolefins of such high molecular weight that the polymer would not be processable by a melt process; articles containing extremely high filler loading; articles containing interconnected reinforcement; and articles from molds which require substantial flows through narrow passages.

23 Claims, 6 Drawing Figures

OLEFIN POLYMERIZATION

FIELD OF THE INVENTION

This invention relates to methods for the polymerization of olefinic compounds by coordination catalysts, to apparatus useful for practicing these methods, and to articles made by the methods. More specifically, it relates to the conversion of olefinic compounds to useful articles by substantially complete polymerization in a mold, to equipment useful for practicing the method and to articles formed by such in-mold polymerization.

BACKGROUND ART

Polymerization of reactive components in a mold is commercially practiced with thermosetting resins, primarily polyurethanes. It is known as a reaction injection molding or RIM process. Other resin systems which are known to be polymerized in RIM processes are polyepoxides, polyesters and nylon systems. Shaped articles from thermosetting resins must, of course, always be formed from one or more monomeric reagents or prepolymers by reaction in a mold having the shape of the article, whereas articles from thermoplastic polymers are formed by shaping of the finished polymer or by melting the previously manufactured polymer and shaping it by methods such as compression molding, injection molding, blow molding, and sheet extrusion combined with thermoforming.

According to this invention, shaped articles of olefin polymers are formed by carrying out the polymerization reaction in a mold which has the shape of the article.

The polymerization of α-monoolefins to useful thermoplastic polymers by catalysis employing coordination catalysts is well known. Generally, the coordination catalysts comprise at least two compounds, one being a compound of a transition metal of groups IV--VIII of the Periodic Table, referred to herein as "procatalyst" and the other being an organometallic compound of a metal of groups I–III of the Periodic Table, referred to herein as "cocatalyst". Such coordination catalyst systems are often referred to as Ziegler catalysts. A group of these catalysts which is stereoregulating in the production of polymers of propylene and higher α-monoolefins is often referred to as Ziegler-Natta catalysts. In commercial Ziegler-Natta catalysts, the procatalyst is generally an active form of titanium chloride and the cocatalyst an alkyl- or alkyl halide compound of aluminum. These catalysts may be further modified by addition of compounds which increase the stereoregulating effect of the catalysts, referred to herein as selectivity control agents.

Polymers of ethylene, propylene and 1-butene produced by means of such coordination catalysts are materials of commerce, both as homopolymers and copolymers.

Commercial polyolefins are produced in a variety of well known processes. In all cases, the polymers are produced in polymerization reactors and are finally recovered as a particulate material which must later be converted into a useful article by a process which typically involves melting of the polymer. Methods of forming articles by fusion of polymer powder are also known; they may be employed to form articles from polymers whose molecular weight is too high to permit melt forming by means of commercial equipment. To our knowledge, useful polyolefin articles have not heretofore been produced by carrying out the polymerization of the monomer with a coordination catalyst in a mold having the shape of the desired article.

SUMMARY OF THE INVENTION

Conventional olefin polymerization processes have large fixed and variable costs associated with the recovery of polymer from the reactor and conversion of the polymer into a form in which it is a saleable product. Further costs are associated with storage of polymer product and shipping to the user.

Manufacture of large parts from commercial polyolefins by the conventional injection molding method requires expensive equipment because of high injection pressures and resulting high clamping forces for the molds.

All of these costs can be greatly reduced by the method of this invention, in which a final article is produced by substantially complete conversion of the olefin monomer to polymer in a mold having the shape of the desired article.

This method also permits the production of polyolefin articles which are difficult or impossible to produce from polyolefin powder or pellets by conventional methods. For example, it makes it possible to produce articles of polyolefins of such high molecular weight that the polymer would not be processable by a melt process. It also becomes possible to produce articles containing extremely high filler loading; to easily produce articles containing interconnected reinforcement; and to produce articles in molds which require substantial flows through narrow passages.

Most broadly, the method of this invention is a method for producing an article of olefin polymer which comprises substantially completely polymerizing an olefinic monomer feed, in contact with a coordination catalyst suitable for olefin polymerization, in a mold having the shape of the article, at conditions under which the polymer is produced as a coherent, useful article in the shape of the interior of the mold, and removing the article from the mold.

The invention also comprises apparatus for practicing the method, and articles consisting essentially of thermoplastic polyolefins, produced in the shape of the reaction vessels in which they are formed by substantially complete polymerization of an olefinic monomer feed in contact with a coordination catalyst at conditions under which the polymer is produced as a coherent mass in the shape of the vessel.

For features of apparatus which are common to this invention and to reaction injection molding of thermosetting resins, reference may be made to such books as "Reaction Injection Molding" edited by Walter E. Becker, Van Nostrand Reinhold Company, 1979; and "Introduction to Reaction Injection Molding" by F. Melvin Sweeney, Technomic Publishing Co, 1979, and to relevant patents.

DETAILED DESCRIPTION OF THE INVENTION

Advantages of the Invention

The method of this invention is not a replacement for all methods of manufacturing olefin polymers and converting them into useful articles. However, it does have unique advantages, especially for production of large parts and for production of articles consisting of polymers of such high molecular weight that they cannot be shaped by melt forming.

The method of this invention permits the production of large parts, if desired of filled polymer, which faithfully reproduce details of the mold. Production of large parts in a closed mold is made economical because pressures of at most a few hundred pounds per square inch are required; this compares with 15,000–20,000 psi injection pressure in conventional injection molding. In addition to the low injection pressure which is set by the vapor pressure of the monomer at the molding conditions, the fact that monomer and not polymer is injected means that superb mold resolution and superb definition of the mold transferred to the part is possible. In addition, the molding difficulties associated with weld lines and with difficult flow around right angle corners or through restricted sections are eliminated, allowing production of novel types of injection molded parts. Fillers, colors and other materials can be present in the mold or entrained in the feed entering the mold, resulting in a filled or colored part without a separate compounding step; or a continuous reinforcement can be placed in the mold before the injection of the monomer.

In addition to the opportunity to form large and uniquely-filled parts, the materials produced by this technique are potentially much different from current injection molded materials in several important ways. First, because of the introduction of the material as monomer into the mold, high melt flow is not required. As a result, extremely high molecular weight, low melt flow materials can be produced directly in the mold. These materials can have advantages over conventional polyolefins in terms of abrasion resistance, impact strength, creep, toughness and other properties.

In addition to the possibility of forming articles of ultrahigh molecular weight polymers by this technique, the crystal structure and rate of crystallization of materials formed by this method may be substantially different from conventional reactor polymers. This can give advantages in processing time beyond the cycle time of the actual molding process in the case of polybutylene and other materials that are slow to crystallize after thermal injection molding. This change in crystallization behavior, in the case of predominantly isotactic poly(1-butene), is consistent with the low temperatures and pressures (well below the melting point of the polymer) required to form solid poly-1-butene parts in the mold. The low temperatures of molding are allowed by the solubility of the polybutylene in the 1-butene monomer. From X-ray diffraction studies it appears that Form I is the predominant crystalline form in polybutylene produced according to this invention.

The constraint that substantially all of the liquid monomer must be converted into solid, imposed on the polymerizing system according to this invention, may result in dramatically different amounts of crystallinity in isotactic polymers than are observed in conventional reactor processing.

Reaction Materials

Monomers

This invention is suitable for the polymerization of normally gaseous and normally liquid olefins, including vinyl arenes, which can be polymerized by contact with coordination catalysts. Suitable monomers are ethylene, aliphatic and cycloaliphatic alpha monoolefins having from 3 to 12 carbon atoms per molecule, and styrene and divinylbenzene. Olefins may also be copolymerized in some cases with diolefins, for example, with vinyl cyclohexane, butadiene or norbornadiene, to produce polymer articles containing some residual unsaturation.

For practical purposes, the monomers of greatest interests are ethylene, propylene and 1-butene, for the production of both homopolymers and copolymers. Production of articles of isotactic polystyrene is also of interest.

Catalysts

A number of different coordination catalysts of the Ziegler-Natta type are useful in the process of this invention. Broadly, such catalysts comprise a pro-catalyst which is a solid compound of a transition metal of group IV to VIII of the Periodic Table and a cocatalyst which is an alkyl compound, including alkyl halides and hydrides, of a metal of groups I to III. It is now well known that only a limited number of these compounds are practical for effectively converting a given monomer into a desired polymer. In general, the same catalysts which are effective for the polymerization of a particular monomer feed in a conventional polymerization process are also effective for the same conversion in the process of this invention.

Ziegler-Natta coordination catalysts are discussed in detail in the book "Ziegler-Natta Catalysts and Polymerizations" by John Boor, Jr., Academic Press, 1979 and in numerous patents and review articles, including those cited by Boor.

More recently, catalysts having much higher activity have been developed both for polymerization of ethylene to linear high density polyethylene and for the stereoregular polymerization of higher α-monoolefins. The most active of these catalysts comprise as procatalysts composites of magnesium or manganese halide, titanium halide and, in the case of stereoregulating catalysts, an electron donor. The cocatalysts generally are aluminum trialkyls and, in the case of stereoregulating catalyst, a selectivity control agent. Such catalysts are described, for example, in U.S. Pat. Nos. 4,113,654 and 4,265,785 and many other patents for ethylene polymerization and in U.S. Pat. No. 4,107,413 and 4,329,253 and European Pat. Nos. 19,330 and 29,623 and many others for stereospecific polymerization of α-monoolefins.

Suitable procatalysts for conversion of propylene and other α-monoolefins to isotactic polymers are violet $TiCl_3$ and composites of titanium chloride, magnesium chloride and an electron donor. Procatalysts of the type of violet $TiCl_3$ are preferably employed with alkyl aluminum halides, typically diethyl aluminum chloride, as cocatalyst. Procatalysts of the type of composites of titanium halide, magnesium halide and electron donor are preferably employed with trialkyl aluminum, typically triethyl aluminum as cocatalyst, and with an aromatic ester electron donor, such as ethyl p-methoxybenzoate (p-ethyl anisate) or p-methyl toluate as selectivity control agent.

In the polymerization of 1-butene to stereoregular polybutylene, using a violet $TiCl_3$ procatalyst, the cocatalyst preferably comprises a mixture of dialkyl aluminum chloride and iodide, e.g., diethyl aluminum chloride and iodide, as described in U.S. Pat. No. 3,362,940.

Other Feed Components

Conventionally produced olefin polymers typically contain stabilizers against oxidative degradation which would occur in unstabilized polymer while it is being melted, as in an extruder, for forming in the melt. Since the method of this invention results in articles in final form or at least in a form which is not melted prior to or during use, such articles need not be stabilized to the extent customary in conventional polyolefins. However, stabilizers against oxidative degradation or against degradation caused by actinic radiation may be added with the monomer feed. Compounds are selected for this purpose which do not interfere to a significant extent with the polymerization reaction. Suitable stabilizing compounds may be selected from the following group: 2,6-bis(1-methylheptadecyl)-p-cresol, butylated styrenated cresols, 4,4'-butylidene bis(6-t-butyl-m-cresol), cyclic neopentanetetrayl bis(octadecylphosphate), 4,4'-cyclohexylidene bis(2-cyclohexyl phenol), 2,6-di-t-butyl-4-ethyl phenol, 2,2'-methylene bis(4-methyl-6-t-butyl phenol)octadecyl-3,5-di-t-butyl-4-hydroxyhydrocinnamate, tetrakis[methylene(3,5-di-t-butyl-4-hydroxyhydrocinnamate)]methane, 4,4-thiobis(6-t-butyl-m-cresol), 1,3,5-trimethyl-2,4,6-tris(3,5-di-t-butyl-4-hydroxybenzyl)benzene, tri(mixed mono- and di-nonylphenyl)phosphite, and di-t-butyl-p-cresol. Such materials are normally employed at levels of about 0.1% to 1% based on the polymer. Secondary heat stabilizers, such as dilaurylthiodipropionate and light absorbing antioxidants, such as 2-hydroxy-4-n-octyloxybenzophenone may also be employed.

Other non-interfering additives may also be added, such as pigments, acid acceptors, slip agents, antistatic agents and impact modifiers.

The method of this invention is also suitable for production of reinforced or filled polymers by use of conventional fillers or reinforcing components in particulate or filamentary form, e.g., short segments of fiber glass, silica, alumina, carbon black, silicates, aluminosilicates such as mica, talc, clays, vermiculite and asbestos, and calcium silicates such as wollastonite.

Since sensitivity to added compounds may be different for each system, it will be desirable to determine experimentally whether a compound to be added may interfere with the reaction.

Molecular Weight Control

In conventional olefin polymerization processes, the polymer produced if the polymerization is carried out without chain transfer agent would generally have such a high molecular weight that it is not useful for commercial applications which require melting of the polymer. It is therefore conventional to employ a chain transfer agent, typically hydrogen, for molecular weight control. In the present invention it is not necessary to prevent production of polymer of very high molecular weight; it may be desired to produce them. If it is desired to control molecular weight to a lower value, known chain transfer agents may be employed which are not gases, e.g., zinc or cadmium dialkyls, suitably diethyl zinc or diethyl cadmium. Molecular weight also may be controlled to some extent by appropriate selection of catalyst components and by control of reaction temperature. Higher temperatures favor lower molecular weights.

Apparatus

The apparatus of this invention is a device for converting olefinic monomers directly into finished articles.

Broadly, the apparatus comprises a mold which serves as reaction vessel, and means for charging controlled amounts of monomer and of catalyst to the reaction vessel.

The feed charging means may comprise a feed storage vessel and means for charging controlled amounts of monomer to the mold.

The catalyst charging means comprise storage vessels for the catalyst or catalyst components and means for charging controlled proportions of the catalyst or catalyst components to the mold. This may include means for preparing solutions or suspensions of the catalyst components in separate portions of monomer and means for mixing the catalyst components and injecting them into the mold together with the required amount of monomer.

In general, apparatus for practicing this invention with liquid monomer feeds is similar to that which is known from patents and articles regarding the practice of reaction injection molding of thermosetting resins, known as the RIM method or process. The types of molds suitable for reaction injection molding are also suitable in the present process. However, whereas in RIM two reactive monomer streams must be mixed in controlled proportions and quickly injected into the mold, this is not required in the present invention, where the feed may be a single monomer or even a mixture of monomers which need not be kept separated. On the other hand, in this process it is necessary to employ small, measured amounts of a catalyst which typically comprises at least two components which must not be combined in the presence of monomers at conditions at which polymerization is initiated.

Figure 2:
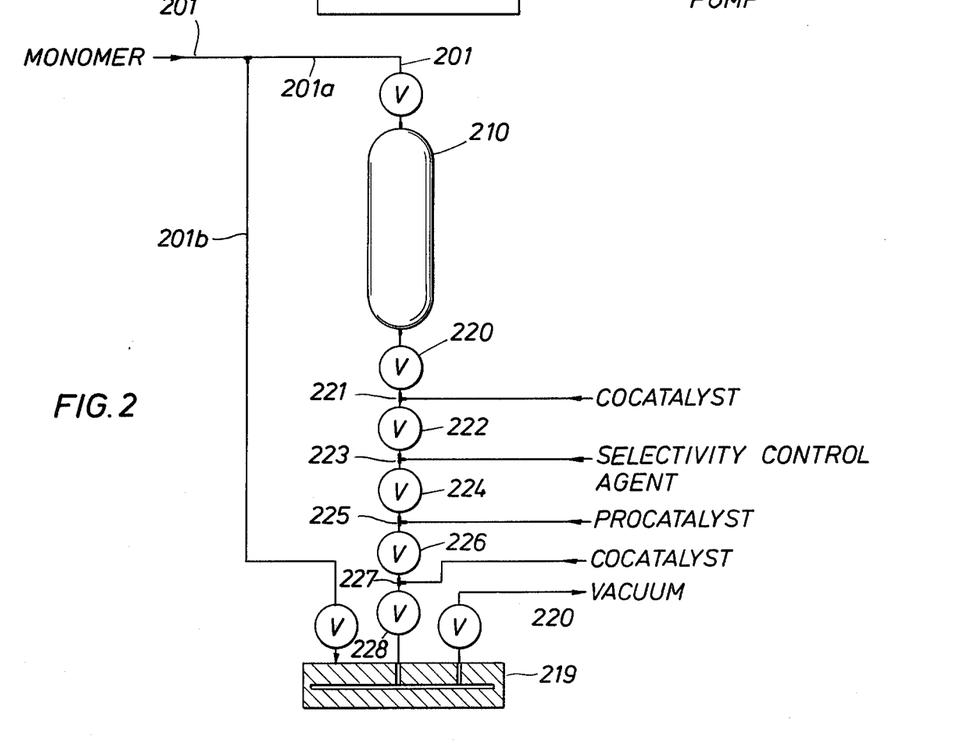
FIG. 2 is a schematic drawing of apparatus for a second mode of practicing the invention.

Accordingly, it is practical to divide the monomer charge into two portions and combine each with one of the catalyst components, and to deal with these two streams in the same way as with the two reactant streams in the RIM process. However, one may also charge the monomer to the reactor as a single stream, carrying all the catalyst components, as illustrated in FIG. 2 of the drawing, or one may place one catalyst component in the mold and add the other catalyst component mixed with the monomer feed stream.

Figure 1:
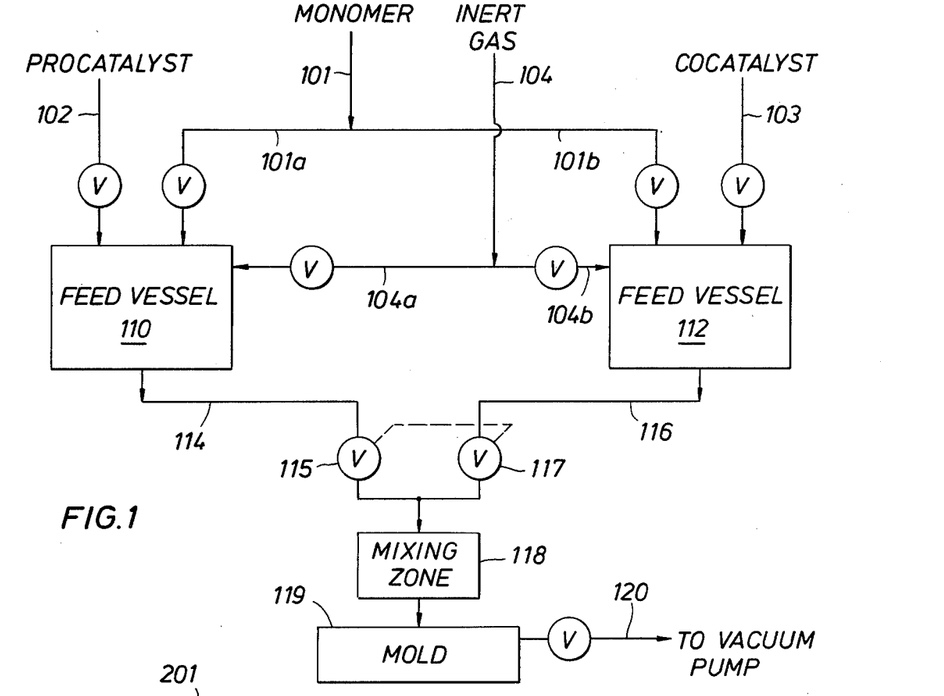
FIG. 1 is a flow diagram of one mode of practicing the invention.

Apparatus suitable for use with liquid feed and a two-component catalyst is shown schematically in FIG. 1 of the drawing. The apparatus comprises feed charging vessels 110 and 112, a mixing device 118 and mold 119, together with auxiliary equipment. Liquid monomer is charged to vessels 110 and 112 through line 101 and valved branch lines 101a and 101b. Solid procatalyst is added to vessel 110 through valved line 102. It may be added as a powdered solid or slurried or dissolved in monomer or in an inert liquid. Cocatalyst is similarly added to vessel 112 through valved line 103, either neat or in monomer or inert diluent.

The amounts of components added to vessels 110 and 112 are predetermined to provide the desired concentration of catalyst components. The vessels may contain suitable agitating means and heat exchange means, not shown. As illustrated, vessels 110 and 112 are pressurized by inert gas. Before charging feed and catalyst to the mold, the mold and mixing device are evacuated through line 120. Separate feed streams containing procatalyst and cocatalyst, respectively, are then charged through lines 114 and 116, which contain valves 115 and 117. These valves are controlled to open and close simultaneously and to admit streams from lines 114 and 116 to mixing device 118, where they are intimately admixed before passing on into the mold. The mixing device may be a static mixer or an agitated device. The mixed streams react in the mold to form polymer in the shape of the mold. On completion of the reaction, the mold is opened and the shaped articles is removed from the mold.

Since active coordination catalysts can be formed over a wide range of ratios of cocatalyst to procatalyst, it is not necessary to charge the feed streams in a precise ratio. This is different from reaction injection molding of thermoset polymers, in which precise proportioning of the charge streams in stoichiometric ratios is essential. If feeding in precise ratios is desired in the system of FIG. 1, it can be accomplished by using metering pumps instead of relying solely on charging under inert gas pressure.

Apparatus employed in some of the examples which illustrate the invention is shown in FIG. 2. In this mode of practicing the invention, measured portions of the catalyst components were placed in short sections of pipe 221, 223, 225 and 227 between valves 220, 222, 224, 226 and 228, as indicated in the drawing. Liquid monomer under inert gas pressures or under its own pressure was then allowed to flow through the sections containing the catalyst components and into mold 219 by opening the intervening valves, and the mixture was polymerized in the mold. The polymer article was removed after polymerization was complete.

Figure 3:
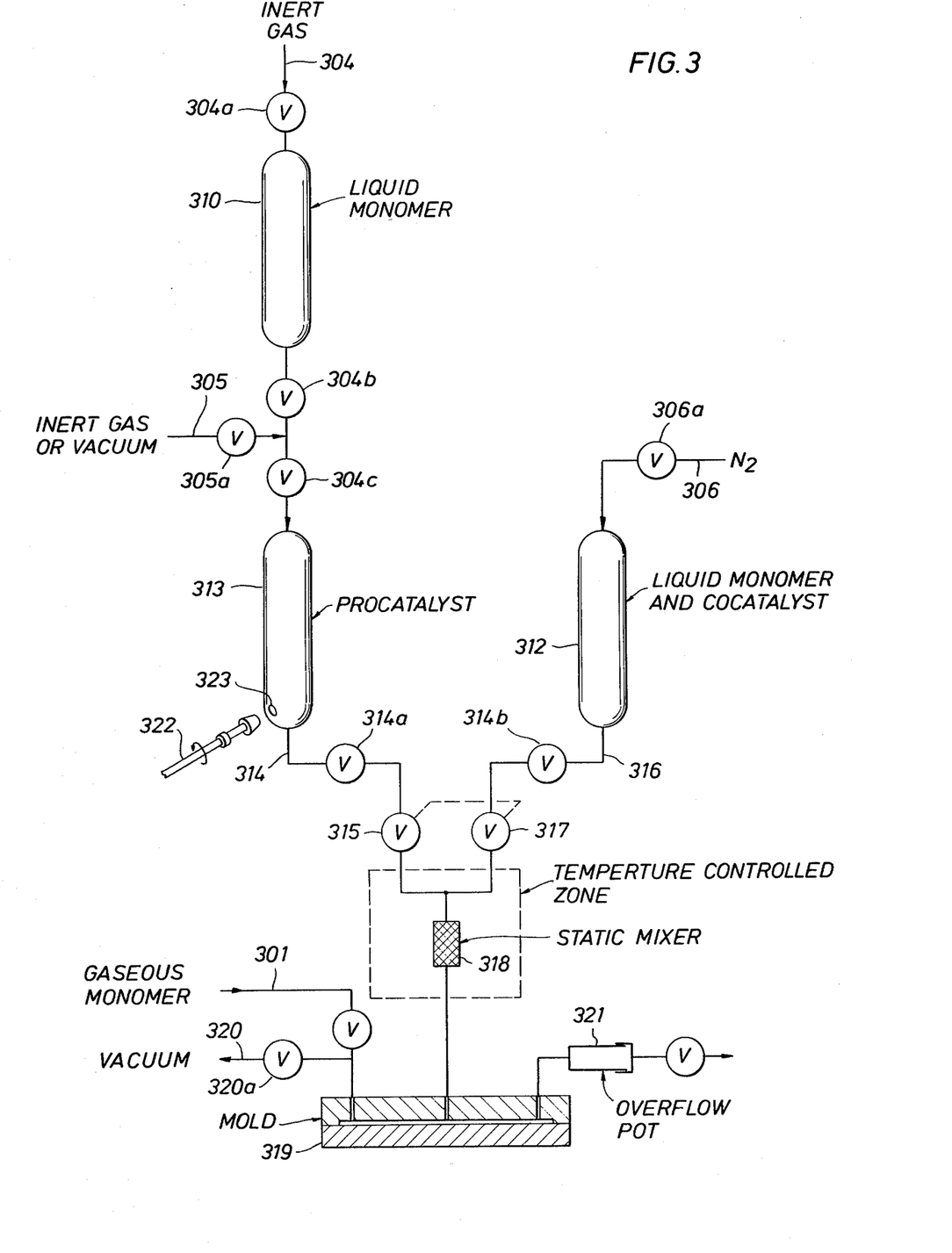
FIG. 3 is a schematic drawing of apparatus for practicing the invention in a manner similar to that of the flow scheme of FIG. 1.

Another arrangement of apparatus employed in carrying out some of the illustrative experiments is shown in FIG. 3. This is a laboratory version of the apparatus of FIG. 1. The apparatus comprises liquid monomer feed vessels 310 and 312, procatalyst feed vessel 313, a static mixer 318 (which is preferred but may be omitted), mold 319, overflow pot 321 and auxiliary lines and valves interconnecting the vessels and connecting to inert gas supply and vacuum.

In this mode of practicing the invention, mold 319 is evacuated via line 320, with or without heating to remove contaminants. If desired, it may be purged with a gaseous monomer via line 301. A part of the monomer charge is then admitted from vessel 310 to vessel 313 which contains the solid powdered procatalysts; the procatalyst is suspended and dispersed in the liquid monomer via magnetic stirrer 323 (rotated by rotating magnet 322 outside the vessel). Vessel 312 is charged with the desired quantity of monomer and cocatalyst (dissolved and mixed in the monomer), and mold 319 and optional mixer 318, if used, are adjusted to the desired temperature. Nitrogen pressure sufficient to maintain the monomers in the liquid state is applied to vessels 313 and 312, and the two monomer streams are mixed and admitted to the mold by opening ganged valves 315 and 317. An initial portion of the reacting system may be allowed to pass through and out of the mold to an overflow vessel 321, to remove impurities or reduce the amount of off ratio material incorporated due to transient lead/lag problems at the moment the valves are opened. Alternatively, the mold may be tilted and the overflow vessel may serve to accept permanent gases displaced from the mold via the introduction of catalyzed monomer, or the overflow vessel may serve as a reservior of polymerizing fluid which may flow back into the mold to make up volume lost by shrinkage during polymerization.

After the desired quantity of catalyzed monomer feed is introduced, valves 315 and 317 are shut, the polymerization completed, and the mold 319 opened to remove the part. Valves 314a & b, 315 & 317, 306a, 304c, 304b and 304a are used to isolate the various vessels for removal and cleaning or recharging.

Alternatively, vessels 310 and 312 may be filled via lines 304 and 306, respectively.

When the formed article must be removed from the mold it is necessary to employ split molds, i.e., molds which can be separated into two or more component parts to permit removal of the article. Such molds are well known.

Figure 4:
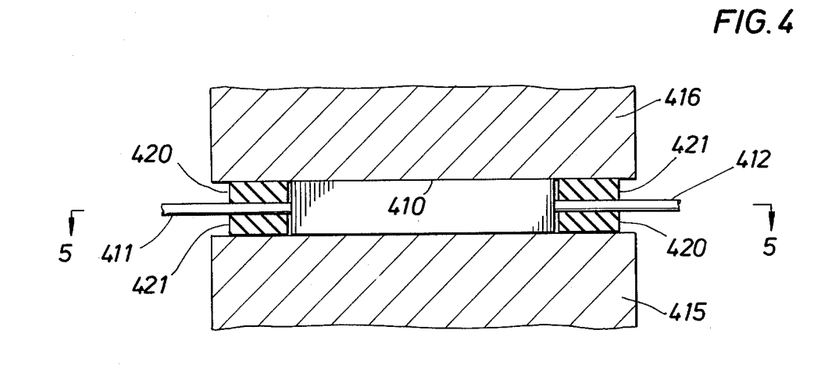
FIG. 4 is a sectional front elevation view, along line 4—4 of FIG. 5, of a mode of practicing the invention in a manner in which the mold becomes part of the finished article.
Figure 5:
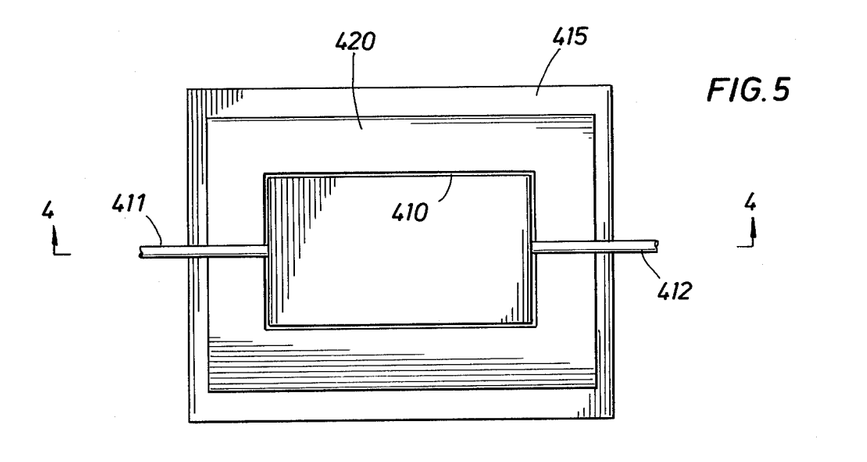
FIG. 5 is a sectional plan view of the same apparatus along line 5—5 of FIG. 4.
Figure 6:
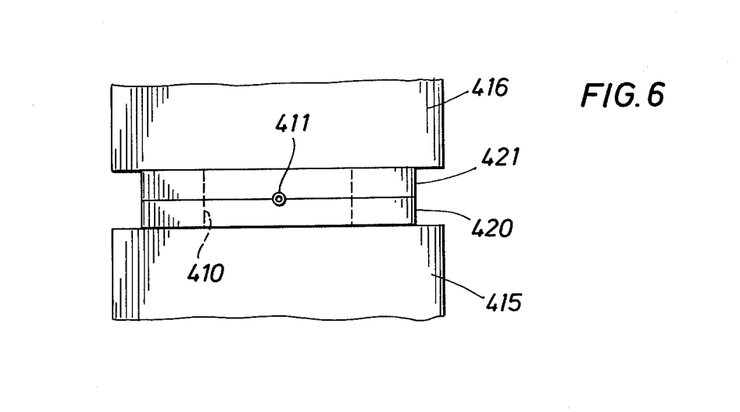
FIG. 6 is a side elevational view of the same apparatus.

In one mode of practicing the invention the mold becomes part of the article and need not be removed. This is suitable, for example, in producing a plastic article which has a skin of metal or other suitable material. This may be suitable for producing structural parts for buildings. Generally the mold defines a simple shape, such as a wall panel. The mold must contain an opening for admitting feed and preferably a separate opening for removal of air. If such a mold is not able to withstand the pressures which may occur during polymerization it is placed in a press in such a manner that all its surfaces are held firmly in place, as illustrated in FIGS. 4, 5 and 6. FIG. 4 is a sectional view of the apparatus, along line 4—4 of FIG. 5. FIG. 5 is a sectional view along line 5—5 of FIG. 4. FIG. 6 is a left side elevation.

FIGS. 4, 5 and 6 schematically show such a skin-mold 410 in a press having a lower platen 415 and an upper platen 416. The mold is a rectangular parallelipiped of a suitable material, such as sheet metal, having an entry opening connected to line 411 and a vent opening connected to line 412. The sides of the mold are reinforced against distortion under pressure by a lower and upper retainer, 420 and 421, respectively, which are designed to snugly fit around the sides of the mold and have grooves to accomodate lines 411 and 412. These retainers may be lined on the side close to the mold with a flexible material such as an elastomer edged with a rigid material, or may be made of a relatively firm material.

In operation, multiple molds are prepared. Lower retainer 421 is placed on platen 415. The mold is then placed on platen 415 in the open space of the retainer, with lines 411 and 412 resting on grooves in the retainer. The upper retainer 421 is then put in place. Lines 411 and 412 are connected to the feed means and vent means. Air is removed from the interior of the mold, for example by purging with a gaseous monomer or by inert gas followed by monomer and line 412 closed by a valve, not shown. Feed and catalyst are then charged to the mold. After polymerization is complete, lines 411 and 412 are disconnected, the press is opened and the finished article removed. Lines 411 and 412 may be short sections, originally attached to mold 410, which are removed from the formed article.

The principles of suitable apparatus are illustrated in the drawing. Auxiliary parts of the apparatus are not illustrated. Numerous refinements of the apparatus are possible. For example, while charging of liquid feed streams under inert gas pressure is illustrated, charging of liquid feed may also be accomplished by means of pumps or by lance pistons in the feed vessels. Vapor phase feed streams may be charged from pressurized vessels or through pumps.

Means for heating or cooling the feed vessels, mixing vessel, mold and feed lines are preferably employed but are not illustrated. Persons skilled in the polymer molding art will understand how to employ such modifications and refinements within the scope of the invention.

Accommodation for the shrinkage which occurs in the mold during the course of polymerization is required. This may accomplished by keeping the mold in communication with a source of additional feed, suitably without additional catalyst components, or by providing a mold which has a component that can be moved inward to reduce the mold volume as polymerization progresses.

This invention also permits production of cellular articles. When producing cellular articles, as described below, no accomodation for shrinkage is required.

Method

Methods of practicing the invention have been indicated above in the description of the drawing.

Broadly, the methods comprise feeding gaseous or liquid monomer to a mold in which it polymerizes under the action of a suitable catalyst and either continuing to add monomer to the mold as the polymerization proceeds or filling the mold with liquid monomer and an appropriate amount of catalyst, closing the mold and reducing the mold volume mechanically as the polymerization proceeds. Upon completion of the polymerization, the mold is opened and the article removed, except where the mold itself becomes the skin of the article.

The method of combining the catalyst components, i.e., procatalyst, cocatalyst and, in some cases, selectivity control agent, is important in the practice of the invention. Procatalyst and cocatalyst must not be combined in the presence of monomer under conditions at which polymerization may begin until they are ready to be injected into the mold.

The following modes are suitable for combining reactants and catalyst components:

1. Each catalyst component is dissolved or suspended in a separate portion of feed monomer, in a predetermined concentration. Measured portions of the monomer are then combined, either in a mixing device from which they are promptly discharged into the mold or directly in the mold. As the mold contents shrink somewhat during the course of the polymerization, the mold is maintained fully by addition of monomer or by mechanically reducing the mold volume. Upon completion of the reaction, the mold is opened and the finished polymer article is withdrawn, except when the mold is intended to be part of the article.

2. One catalyst component, suitably the procatalyst, is placed in the mold and the other catalyst component or components are then added in controlled amount, together with the monomer feed. Thereafter the operation continues as described above. In this mode, the catalyst component which is placed in the mold may be carried on a solid, which may be a solid intended to serve as filler in the finished article.

3. If the catalyst consists of a single component, it is dissolved or suspended in a single monomer feed stream and charged to the mold. Thereafter the operation continues as described above.

Modification of these procedures will be apparent to persons skilled in olefin polymerization.

Cellular articles may be made from monomers or feed mixtures which contain monomers that are gaseous at atmospheric pressure at the reaction temperature by conducting polymerization at an elevated pressure until the mold is partly filled with polymer in a viscous solution in residual monomer and then quickly releasing the pressure on the mold and thereafter allowing polymerization to proceed to completion. Preferably a suitable foam nucleating agent, e.g., dried silica gel, is placed in the mold to facilitate foaming. This method is especially suitable for producing foams of relatively low density.

Alternatively, chemical blowing agents may be placed in the mold which do not interfere with the polymerization reaction and which do not decompose to liberate gas at a controlled reaction temperature. They are then permitted to liberate foaming gas, after partial completion of the reaction, by letting the reaction temperature rise or by heating the mold.

Reaction Conditions

The present invention may be practiced under a relatively wide variety of conditions of reaction time, temperature, pressure, reactant phase and agitation. Selection of conditions is a function of the reactivity of the feed monomer, the activity and selectivity of the catalyst, and of the type of polymer desired.

Conversion

It is essential in the practice of this invention that conversion of monomer to polymer be substantially complete, i.e., greater than 90 percent, preferably at least 95%, and result in a coherent polymer mass which fills the mold completely. This represents a basic difference between conventional olefin polymerization and olefin polymerization according to this invention, since in the conventional polymerization processes the polymer concentration is maintained at a relatively low value, typically well below 50%, whether in solution, in a slurry of polymer powder in liquid monomer or diluent, or in suspension of polymer powder in gas phase, and the polymer remains either in dissolved state or as small discrete particles.

Temperature

The monomer may be at a temperature in the range from chilled to elevated temperatures when charged to the mold. Temperatures from below 0° C. to 150° C. may be employed. Generally preferred are feed temperatures in the range from 10° to 90° C.

Since the polymerization reaction is exothermic, the temperature in the mold during the course of the polymerization is usually higher than the temperature of the feed, unless a chilled mold is employed. Temperature distribution in the mold is affected by such factors as mold geometry, characteristics of the mold as a heat sink or heat supplying means, reactivity of catalyst and monomer, and the like. To some extent, the selection of suitable temperatures and heat exchange conditions will have to be based on experience with a given system of mold, feed and catalyst.

In the polymerization of ethylene and propylene, conditions must be selected such that the final temperature of the polymer is high enough to permit some polymer to be dissolved in the monomer, sufficient to cause the polymer mass to be fused into a relatively homogeneous coherent article rather than an article consisting of more or less loosely cohering discrete polymer particles. This is typically within 10° to 50° C. below the melting point of the polymer. In the case of poly-1-butene and other polymers which are soluble in the corresponding monomer, essentially homogeneous coherent articles may be produced even through the maximum temperature in the mold is much lower.

Pressure

The pressure should be such that the monomer in the mold is maintained in liquid phase or in supercritical phase. Suitable pressures in the mold are in the range from 0 to 1000 psi gauge, depending on the monomer and the temperature employed.

Time

The time required to complete polymerization is a function of the reactivity of monomer and catalyst, and of the temperature maintained in the mold. Substantially complete reaction may be attained in as little as 30 seconds or over a period as long as several hours.

The invention is further illustrated in the following examples. These are given for the purpose of illustration and are not meant to limit the invention to the particular reactants and conditions employed therein.

One mold employed in the examples, Mold A, consisted of two 1 inch×7 inch×12 inch 316 stainless steel plates defining a ⅛ inch×3 inch×8 inch cavity. The steel plates were held together by bolts. The cavity was sealed by a rubber o-ring joined with silicone "RTV" elastomer caulking. Feed was charged through a port entering the cavity through the top plate at its center; the evacuation line was connected to the cavity near one of the short edges. The mold was designed to withstand 10,000 psig of pressure. It was not fitted with heat exchange means, but represented a substantial heat sink, having a weight of 52 pounds. For some experiments, the mold was fitted with a thermocouple at the midline of one steel plate, to monitor mold temperature; for other experiments the mold was fitted with a thermowell protruding into the center of the mold cavity to monitor the temperature of the polymerizing mass. A second mold employed in the examples, Mold B, was a 100 cc stainless steel autoclave having an interial diameter of 4.3 cm, height of 6.7 cm, weighing 2.2 kg. Generally the contents of Mold B were stirred during the run by a magnetic stir bar at the bottom of the autoclave.

The following materials were employed in the examples:

Monomers

All monomers were commercially available materials of high purity.

Propylene and 1-butene were passed, before use, through a BTS column and a 3 A molecular sieve column for removal of residual oxygen and water, respectively. Styrene was passed through a 4 A molecular sieve column and an activated F-1 alumina column for removal of residual water and tert.butyl catechol, respectively. Acrylonitrile and 4-vinylcyclohexene were dried before use by passage through a molecular sieve column.

Procatalysts

The procatalyst designated $TiCl_3$ was in some cases an aluminum-metal reduced and subsequently activated $TiCl_3$ sold by Stauffer Chemical Company as $TiCl_3$ 1.1; in others it was Stauffer Grade 1.13, which is modified to exhibit somewhat higher activity and stereoregulating ability than grade 1.1 in conventional propylene polymerization. In the examples, these two products gave similar results.

The procatalyst designated Mg/Ti/EB was a solid in which $TiCl_4$ and ethyl benzoate are present on a support which is essentially $MgCl_2$. The procatalyst had a titanium content of 3.52%wt and was capable of producing polypropylene of 4.0%wt xylene solubles with a yield of 392 kg per gram titanium when employed in a one hour bulk polymerization at 67° C. in the presence of hydrogen with triethyl aluminum cocatalyst and para-ethyl anisate selectivity control agent at mole ratios of 70:1 TEA:Ti and about 0.31:1 pEA:TEA.

Cocatalysts

TEA designates triethyl aluminum and DEAC designates aluminum chloride. They were used as purchased from Texas Alkyls, Inc., either in 100% concentration or in 25%wt solution in n-heptane.

Selectivity control agents pEA designated para-ethylanisate. It was purchased as chemically pure material.

Fillers

Cabosil: fumed silica; true density 2.2 g/ml; bulk density 0.032 g/ml.; surface area 200±25 m²/g; particle size 0.014μ. This was dried before use in a muffle oven at 300° C. for 24 hours.

Bentonite: Wyoming; air purified. Dried at 300° C. for 24 hours.

Mica: Hammer-milled Phlogopite mica; bulk density 0.639 g/cc. Martin-Marietta Corp. Suzerite Mica 60 H. Dried before use at 300° C. for 3 days.

Other chemicals: $COCl_2$ and $SOCl_2$ were purchased as chemically pure materials and used as purchased.

EXAMPLE 1

This example illustrates the method in which one component of a two-component catalyst is placed in the mold. The apparatus employed utilized a single 150 cc pressure vessel as charge vessel.

The open mold was loaded in a dry box with 220 mg of catalyst A, which was smeared over the inside surface of the lower mold half with a spatula. The mold was then sealed, removed from the dry box, and connected to the feed vessel through a line and series of valves which permitted evacuation of the mold and lines. The feed vessel contained 1 ml of triethyl aluminum (TEA) dissolved in 60.1 g of purified and dried butene-1. The lines and mold were evacuated and the butene/TEA solution admitted to the mold.

The mold was initially at 25° C.; the temperature increased to a maximum of 30° C. within 5 minutes of charging the monomer to the mold, due to the polymerization exotherm.

The butene feed vessel was maintained at a temperature warmer than the mold (40°-60° C.) to drive the liquid butene into the mold.

The mold was opened the next morning to reveal a molded sheet of poly(butene-1) with the feel and appearance of poly(butene-1) prepared from this catalyst system in a conventional butene-1 polymerization process. The part was a single piece of plastic, strong, tough, smooth and exactly reproducing the mold except for shrinkage marks on the upper face.

The weight of the part was 38 g; the mold used holds 29.5 g of monomer and would hold 44 g of perfect void-free poly(butene-1); the difference between theoretical (44 g) and observed (38 g) weight is attributable to interruption of monomer flow into the mold before all shrinkage was accommodated.

The molded piece was purple in color. This indicates that the TiCl$_3$ catalyst remained active overnight although the theoretical heat evolution had occured within five minutes of monomer introduction.

Analysis of the vapor and solid mold contents proved that greater than 95% conversion of monomer to polymer had occurred in-mold.

EXAMPLE 2

The mold of Example 1 was dried, rinsed with TEA/heptane, and fitted to the equipment shown in FIG. 3. The procatalyst side was charged with 196 mg of TiCl$_3$ and 62.4 g of purified 1-butene and the cocatalyst side was charged with 1 cc of 25% triethyl aluminum in heptane, dissolved in 55.1 g of 1-butene. All lines and vessels were dried and purged with nitrogen via evacuation/pressurization cycles, and assembled in the dry box. The assembly was removed from the dry box, loaded with monomer and catalyst components, and connected to the mold; the new connections were then purged via evacuation/pressurization cycling.

The mold was filled by opening the mechanically ganged values and allowing the two monomer streams to impinge, flow through a Kenix static mixer, and enter the mold. The temperature rose rapidly to about 30° C. The butene-1 was converted to a solid part with a smooth, glossy lower surface and removed from the mold. The molded plaque lost 1.5% of its weight on standing, indicating the level of residual monomer in the plastic after polymerization. As before, the polymerization proceeded at a low temperature (25°-30° C.) but the part produced was solid plastic (density 0.887 g/cc) of excellent mechanical integrity and surface appearance.

The polymer was analyzed and found to have a number average molecular weight, $\overline{Mn}$, of 141,000; a weight average molecular weight, $\overline{Mw}$, of 1,265,000; and a molecular weight distribution ($\overline{Mw}/\overline{Mn}$) of 9.0. The part contained 10.2% of atactic material extractable by diethyl ether (Soxhlet) and 89.8% of isotactic ether insoluble material.

EXAMPLE 3

The procedure of Example 1 was substantially repeated with propylene as the monomer, using 100 mg of TiCl$_3$ smeared on the lower mold face, and 0.2 cc of 25% TEA/heptane solution in the propylene feed. The mold was warmed to 45° C., and the monomer/TEA solution introduced. The resultant molded part had mechanical integrity but was not fully sintered into a sheet of polypropylene, due, presumably to the difference between the reaction temperature and the melting point of propylene. The level of integrity produced in this part was apparently sufficient for various applications, such as insulation board. The material was a granular product which appeared compressed and sintered, with smooth faces, despite the low temperature.

EXAMPLE 4

The equipment of FIG. 2 was assembled, with (in vertically descending order) about 0.04 cc PEA, 0.46 ml 25% TEA/heptane, and 0.03 g Mg/Ti/EB catalyst, loaded into the catalyst train. The mold was purged with gaseous propylene and then liquid propylene under nitrogen pressure was used to drive the catalyst components vertically downward and into the mold. Valves were progressively opened so that PEA was mixed with TEA; that mixture mixed with Mg/Ti/EB and the whole catalyst mixture blasted into the mold with liquid monomer; the mold was sealed, and warmed to 40° C. After 2 hours the mold was warmed to 78° C.

The mold was vented after three hours, with no residual monomer pressure observed. The mold contained a perfect sheet of compressed and sintered granules of polypropylene of considerable integrity and strength. The propylene polymer produced had an atactic (xylene soluble) content of 1.8%, a melt flow of 0.032, a $\overline{Mw}$ of about 1,300,000, and an $\overline{Mn}$ of about 130,000. Conversion of monomer to polymer was 99.9%.

This run is shown as Example VII-I of Table 3.

EXAMPLE 5

A 100 ml autoclave was used as a mold, connected to a 150 cc feed vessel. The equipment was cleaned, dried, and purged with nitrogen as in previous examples. Into the mold was placed about 55 mg of TiCl$_3$; the feed vessel was charged with 30 g of purified styrene and 0.25 cc of pure diethyl aluminum chloride (DEAC). The mold was warmed to 100° C. and the monomer and cocatalyst admitted under 200 psi of nitrogen cap by opening a connecting valve.

The catalyzed monomer began to exotherm within one minute of entering the mold; a peak temperature of 123° C. was obtained after 7 minutes. The mold was allowed to cool after two hours, and was opened to reveal a solid, smooth, hard, strong, glossy cylinder of polystyrene. The polymer contained a small amount (~2%) of unreacted styrene, and was shown by DSC to be largely isotactic polystyrene. Data related to this example are shown as example no. V-1 in Table 1. Date from other similar styrene polymerizations are shown as examples V-2 to V-5. Example V-6 was run using about 50 mg of Mg/Ti/EB procatalyst placed in the mold. Example V-7 used divinylbenzene as monomer, rather than styrene. Example V-0 was run at too low a polymerization temperature and resulted in a liquid rather than solid polymer.

EXAMPLE 6

The procedure of Example 5 was substantially repeated under different conditions with styrene/divinyl benzene and styrene/acrylonitrile mixtures as monomer feeds. The results are shown in Table 2. Attempts to copolymerize styrene with minor amounts of butadiene or butadiene and acrylonitrile resulted in production of liquid polymers.

EXAMPLE 7

Propylene was polymerized by several different methods; the results are shown in Table 3.

Examples VII-1, 2 and 3 were carried out substantially according to the procedure of Example 4. The mold was placed on a hot plate for temperature control.

In Examples VII-4-7, the procatalyst TiCl$_3$ was slurried in cyclohexane, the slurry placed in the mold, the mold rotated to distribute the slurry on the inner mold surface, and the cyclohexane then stripped off and flushed out with propylene before polymerization was started.

Runs VII-8 was carried out by the procedure of Example 1.

EXAMPLE 8

The procedure of Example 4 was substantially repeated using 1-butene monomer and different catalyst and conditions; the results are shown in Table 4.

EXAMPLE 9

The procedure of Example 2 was substantially repeated with various conditions and catalysts. The results are shown in Table 5. X-ray, DSC, gpc and extraction data are presented in Table 6. Mechanical data are presented in Tables 7 and 8.

EXAMPLE 10

The procedure of Example 5 was substantially repeated with various quantities of dried fillers having been charged to the mold initially. Good conversion to filled polymer was observed. Results are presented in Table 9.

EXAMPLE 11

The procedure of Example 10 was substantially repeated with higher loadings of dried filler up to 60% weight; filled solid plaques were obtained.

EXAMPLE 12

The procedure of Example 10 was substantially repeated with reactive agents (including COCl$_2$ and SOCl$_2$) added to the mold with the filler, or added to a separate monomer stream, or used as a vapor pre-treatment of the filler prior to polymerization. Improved filler/polymer adhesion was seed by examination of electron micrographs of the fracture surfaces.

EXAMPLE 13

The procedure of Example 2 was substantially repeated using a mold with a cavity consisting of a finely threaded female die. The resulting threaded polybutene-1 part was tough, strong, glossy, and perfectly reproduced the threads and marks of the mold, down to crisp edged marks with dimensions on the order of 0.001 inch, and considerably smaller radii of curvature. The plastic part readily and smoothly screwed into the steel mold, with an excellent seal.

EXAMPLE 14

The procedure of Example 5 was substantially repeated with propylene and a variety of catalysts. Excellent conversions were obtained, with cylindrical moldings having the properties expected from the catalyst employed being produced. Examples are shown in Tables 10 and 11.

EXAMPLE 15

The procedure of Example 10 was substantially repeated with butylene monomer and the use of dried silica gel as a nucleating agent for foam growth. The polymerizing monomer was allowed to exotherm to the peak temperature gradient (center to surface of mold) representing maximum reaction rate, and then for an additional time such that the temperature gradient had dropped by one third. At that point, the mold was suddenly depressurized by venting the upper gas volume, thus foaming the contents, and the polymerization allowed to proceed. Foamed polymer densities of 0.2 were obtained (IPA displacement) as compared to 0.9 for polymer without foaming agent.

The foam density and character may be controlled over a wide range by appropriate choice of nucleating agent, surfactant agents, volatile components, etc. A preferable method of foaming would be to expand the volume of the mold during polymerization instead of venting monomer.

Data on foamed samples are presented in Table 12.

TABLE 1

HOMOPOLYMERIZATION OF ARENES

| Example | Feed (g) Styrene | DVB | Procatalyst | Cocatalyst | Reaction Temp °C. Start | Peak | Polymer Wt (g) | Extractable % w | DSC Transition Temp °C. |
|---|---|---|---|---|---|---|---|---|---|
| V-0 | 29.7 | | TiCl$_3$ | DEAC | 22 | 40 | 27.4[a] | | |
| V-1 | 30.3 | | TiCl$_3$ | DEAC | 100 | 123 | 26.6 | 17.8[b] | ~207 |
| | | | | | | | | 76.7[c] | ~207 |
| V-2 | 31.1 | | TiCl$_3$ | TEA | 60 | 65 | [a] | | |
| V-3 | 32.6 | | TiCl$_3$ | DEAC | 120 | 138 | 26.7 | 3.4[b] | 201 |
| V-4 | 31.4 | | TiCl$_3$ | DEAC | 150 | 174 | 28.4 | 4.1[b] | 79 |
| V-6 | 32.8 | | TiCl$_3$ | DEAC | 200 | 228 | 31.0 | 4.1[b] | 81-90 |
| V-6 | 25 | | Mg/Ti/EB | TEA | 150 | 171 | 25 | 8.4[b] | |
| V-7 | | 31 | TiCl$_3$ | DEAC | 120 | 209 | 30.6 | 2.1[b] | ~210 |

[a]Polymer was liquid.
[b]Extraction in n-pentane.
[c]Extraction in toluene.

TABLE 2

COPOLYMERIZATION OF ARENES

| Example | Feed Styrene | DVB | Acrylonitrile | Procatalyst | Cocatalyst | Reaction Temp °C. Start | Peak | Polymer Wt (g) | Extractable % w | DSC Transition Temp °C. |
|---|---|---|---|---|---|---|---|---|---|---|
| VI-1 | 32 | 3.1 | | TiCl$_3$ | DEAC | 120 | 150 | 33.3 | 4.6[a] | Smooth |
| | | | | | | | | | 46[b] | |
| VI-2 | 27 | 6.2 | | TiCl$_3$ | DEAC | 120 | 155 | 33.0 | 5.3[a] | ~232 |

TABLE 2-continued
COPOLYMERIZATION OF ARENES

| Example | Feed Styrene | DVB | Acrylonitrile | Procatalyst | Cocatalyst | Reaction Temp °C. Start | Peak | Polymer Wt (g) | Extractable % w | DSC Transition Temp °C. |
|---|---|---|---|---|---|---|---|---|---|---|
| VI-3 | 16 | 16 | | TiCl$_3$ | DEAC | 120 | 195 | 29.9 | 16.1$^b$ 2.8$^a$ | Heating Smooth |
| VI-4 | 15.1 | 15.0 | | TiCl$_3$ | DEAC | 200 | 257 | 29.5 | 2.4$^a$ | Smooth |
| VI-5 | 25 | | 5 | TiCl$_3$ | DEAC | 120 | 187 | | | |
| VI-6 | 25 | | 5 | TiCl$_3$ | DEAC | 150 | 288 | | | |

$^a$Extraction in n-pentane.
$^b$Extraction in cyclohexane.

TABLE 3
HOMOPOLYMERIZATION OF PROPYLENE

| EXAMPLE | PROCATALYST | COCATALYST | SCA | MOLD TEMP °C. | POLYMER WEIGHT (g) | $\overline{M}w$ (BY MELT FLOW) | $\overline{M}w$ (BY GPC) | $\overline{M}n$ (BY GPC) | ATACTIC (XYLENE SOLUBLES) (%) | CONVERSION MONOMER TO POLYMER, (%) | MELT FLOW |
|---|---|---|---|---|---|---|---|---|---|---|---|
| VII-1 | Ti/Mg/EB 30 mg | TEA 0.46 ml | pEA 0.4 ml | 23–77 | 30 g | 1.6 × 10$^6$ | 1.3 × 10$^6$ 1.1 × 10$^6$ 1.0 × 10$^6$ | 130 × 10$^3$ 110 × 10$^3$ 70 × 10$^3$ | 1.8 to 2.9 | 99.9 | 0.032 |
| VII-2 | Ti/Mg/EB 30 mg | TEA 0.46 ml | pEA 0.4 ml | 60–64 | 6 g$^a$ | | 800 × 10$^3$ | 60 × 10$^3$ | 2.9 | | |
| VII-3 | Ti/Mg/EB 30 mg | TEA 0.46 ml | pEA 0.4 ml | 47 | 5 g$^a$ | | 980 × 10$^3$ | 72 × 10$^3$ | 1.8 | | |
| VII-4 | TiCl$_3$ 220 mg | TEA 0.36 ml | pEA 0.4 ml | 24–43 thru 70 | 34.6 g | | | | | | |
| VII-5 | TiCl$_3$ 220 mg | DEAC | pEA 0.4 ml | 25–78 | 21.5 g | | | | | | |
| VII-6 | TiCl$_3$ 230 mg | DEAC | pEA 0.4 ml | 24–60 | 33.0 g | | | | | | |
| VII-7 | TiCl$_3$ | TEA | pEA 0.4 ml | 29–88 | 37.9 g | | | | | | |
| VII-8 | TiCl$_3$ | TEA 0.2 ml | pEA 0.4 ml | 41–70 | 26 g | | | | | | |

TABLE 4
HOMOPOLYMERIZATION OF 1-BUTENE

| EXAMPLE | PROCATALYST Mg/Ti/EB (g) | COCATALYST | ml | MOLD TEMP. °C. | MOLD PRESSURE (psig) | WT OF PLATE (g) |
|---|---|---|---|---|---|---|
| VIII-1 | 0.060 | TEA | 1 | 25–52 | 48-32-72 | 16.7$^a$ |
| VIII-2 | 0.017 | TEA | 1.1 | 25–55 | 78-50-90 | 14.5$^a$ |
| VIII-3 | 0.027 | TEA | 2.4 | 25–61 | 60–120 | 32.6 |
| VIII-4 | 0.011 | TEA | 2.4 | 26–54$^a$ | 25 | 33.0 |

$^a$Mold incompletely filled due to obstruction in feed line or at feed inlet.
$^b$Mold chilled to −26° C. to reduce polymerization rate and then heated to 54° C. after one hour and held one hour, then cooled and opened. The polymer made a solid plate in the mold.

TABLE 5
HOMOPOLYMERIZATION OF 1-BUTENE

| EXAMPLE | MOLE RATIO Ti/Al | TOTAL 1-C$_4$= WITH Ti | TOTAL 1-C$_4$= WITH Al | GROSS TiCl$_3$ (g) | 1-C$_4$= ADDED WITH TiCl$_3$ (g) | 1-C$_4$= ADDED WITH Al (g) | COCATALYST USED | ml | MOLD TEMP °C. | MOLD PRESSURE psig |
|---|---|---|---|---|---|---|---|---|---|---|
| IX-1 | | | | 0.22 | 0 | 60.1 | TEA | 1 | 25–30$^a$ | 50–90 |
| IX-2 | | | | 0.13 | 0 | — | TEA | 2 | 24–27$^a$ | 50–67 |
| IX-3 | 0.44 | 62.4 | 55.1 | 0.196 | 26 | 30 | TEA | 1 | 24–26$^a$ | — |
| IX-4 | 0.72 | 67.7 | 60.2 | 0.205 | 36 | 27 | TEA | 1 | 21$^a$ | — |
| IX-5 | 0.08 | 63.4 | 53.8 | 0.048 | 36 | 28 | TEA | 2 | 22$^a$ | 60–100 |
| IX-6 | 0.48 | 61.7 | 55.1 | 0.197 | 47 | 51 | TEA | 1 | 25–40$^b$ | 85–100 |
| IX-7 | 0.37 | 74.6 | 63.4 | 0.222 | 35 | 53 | TEA | 1 | 25–41$^b$ | 60–100 |
| IX-8 | 0.88 | 60.6 | 62.9 | 0.229 | 40 | 32 | TEA | 1 | 23–48$^b$ | 105 |

TABLE 5-continued

HOMOPOLYMERIZATION OF 1-BUTENE

| | | | | | | | | | | |
|---|---|---|---|---|---|---|---|---|---|---|
| IX-9 | 0.55 | 82.6 | 79.2 | 0.220 | 30 | 34 | TEA | 1 | 25[b] | 60–140 |
| IX-10 | 0.42 | 72.8 | 59.7 | 0.209 | 46 | 29 | DEAC | 0.50 | 23 heat 60[b] | 140 |
| IX-11 | 0.07 | 67.2 | 64.8 | 0.209 | 27 | 40 | DEAC | 1.5 | 62–66[a] | 110–200 |
| IX-12 | 0.06 | 56.7 | 61.1 | 0.200 | 19 | 37 | DEAC | 1.5 | 55–61[b] | 100–200 |

| EXAMPLE | WT OF PLATE | WT OF EXTERNAL POLYMER | MOLD POSITION | DENSITY g/cc | YIELD psi | BREAK psi | % ELONG AT BREAK | % XTAL | TOUGHNESS (psi) |
|---|---|---|---|---|---|---|---|---|---|
| IX-1 | 38.0 | 2.4 | H | | | | | | |
| IX-2 | 32.1 | 1.5 | H | | | | | | |
| IX-3 | 34.5 | — | H | 0.887 | | | | | |
| IX-4 | 36.1 | — | H | | | | | | |
| IX-5 | 31.8 | — | H | | | | | | |
| IX-6 | 37.1 | — | H | 0.879 | 320 | 885 | 255 | 27.3 | 1,500 |
| IX-7 | 35.0 | — | H | | 280 | 860 | 282 | | 1,500 |
| IX-8 | 32.1 | — | V | | | | | | |
| IX-9 | 37.2 | 11.6 | 45 | 0.880 | 270 | 760 | 265 | | 1,360 |
| IX-10 | 14.8 | 43.2 | 45 | | | | | | |
| IX-11 | 20.4 | 36.9 | H | | | | | | |
| IX-12 | 19.1 | 7.6 | H | | 1122 | 2270 | 216 | | |
| | | | | | 2400 | 6285 | 379 | | 13,700 |

[a]Temperature measured at mold surface.
[b]Temperature measured in mold

TABLE 6

CHARACTERIZATION OF SOME 1-BUTENE POLYMERS

| EXAMPLE | CATALYST | TEMPERATURE START | TEMPERATURE PEAK | MOL WT × 10⁻¹⁰ $M_n$ | $M_w$ | $M_z$ | Q | ETHER SOLUBLE (wt %) | % CRYSTALLINITY (DSC) AS MOLDED | % CRYSTALLINITY (DSC) EXTRACTED | % CRYSTALLINITY (X-RAY) AS MOLDED | % CRYSTALLINITY (X-RAY) EXTRACTED |
|---|---|---|---|---|---|---|---|---|---|---|---|---|
| IX-3 | TiCl$_3$, TEA | 24 | 26 | 0.140 | 1.265 | 3.742 | 9.38 | 10.2 | | | | |
| | | | | 0.142 | 1.264 | 3.125 | 8.89 | | | | | |
| IX-9 | TiCl$_3$, TEA | 24 | 26 | 0.164 | 1.655 | 4.425 | 10.12 | 11.6 | | | | |
| IX-11 | TiCl$_3$, DEAC | 62 | 66 | 0.115 | 1.630 | 4.400 | 14.20 | 6.5 | | | | |
| IX-11 | | | | 0.253 | 2.017 | 4.501 | 7.48 | 2.0 | | | | |
| | | | | 0.190 | 2.000 | 4.499 | 10.54 | | | | | |
| IX-12 | TiCl$_3$, DEAC | 55 | 61 | 0.183 | 2.727 | 5.223 | 14.88 | 0.7 | | | | |
| IX-13 | TiCl$_3$, TEA | 23 | 56 | 0.107 | 1.151 | 3.914 | 10.11 | 17.8 | 29.2 | 29.5 | 30.5 | |
| IX-14 | TiCl$_3$, DEAC | 60 | 73 | 0.052 | 0.882 | 3.618 | 16.87 | 4.4 | 26.7 | 38.0 | | |
| IX-15 | TiCl$_3$, DEAC | 60 | 140 | 0.071 | 0.722 | 3.247 | 12.95 | 11.4 | 25.7 | 30.6 | 36 | |
| IX-16 | TiCl$_3$, DEAC | 60 | 67 | 0.066 | 1.554 | 4.281 | 23.68 | 30.3 | | | | |
| | | | | 0.054 | 1.558 | 4.527 | 26.95 | | | | | |
| IX-17 | Mg/Ti/EB, DEAC | 51 | 55 | 0.077 | 1.438 | 4.466 | 18.14 | 28.0 | | 20.5 | | |
| | | | | 0.068 | 1.403 | 4.437 | 20.56 | | | | | |
| IX-18 | Mg/Ti/EB, TEA | 51 | 109 | 0.326 | 3.514 | 2.092 | 10.77 | 17.8 | 19.2 | 29.0 | 29 | 37 |
| | | | | 0.346 | 3.838 | 2.161 | 11.09 | | | | | |
| IX-19 | Mg/Ti/EB, DEAC | 50 | 55 | 0.095 | 1.013 | 3.111 | 10.68 | 15.3 | 14.6 | 24.1 | | |
| IX-20 | Mg/Ti/EB, TEA | 22 | 74 | 0.029 | 0.507 | 2.562 | 17.30 | 29.8 | 22.2 | 25.0 | | |
| | | | | 0.029 | 0.507 | 2.736 | 17.61 | | | | | |
| IX-21 | Mg/Ti/EB, DEAC | 72 | 72 | 0.662 | 0.675 | 2.602 | 10.87 | 48.7 | 18.3 | 30.2 | | |
| IX-22 | TiCl$_3$, DEAC | 100 | 111 | 0.049 | 0.753 | 3.528 | 15.34 | 25.4 | 22.3 | 29.0 | 30.7 | |
| IX-23 | TiCl$_3$, DEAC | 100 | 111 | 0.040 | 0.372 | 1.829 | 9.33 | 17.5 | 30.4 | 39.0 | | |
| IX-24 | TiCl$_3$, DEAC | 120 | 162 | 0.032 | 0.212 | 0.828 | 6.68 | 23.3 | 25.0 | 29.8 | | |
| | | | | 0.032 | 0.207 | 0.187 | 6.41 | | | | | |

TABLE 7

MECHANICAL PROPERTIES OF 1-BUTENE POLYMERS OR TAKEN FROM MOLD[a]

| EXAMPLE | ETHER SOLUBLE, % (WT) | TENSILE YIELD STRESS (psi) | TENSILE BREAKING STRESS (psi) | ELONGATION AT BREAK (%) | "TOUGHNESS"[b] (psi) |
|---|---|---|---|---|---|
| IX-6 | — | 320 | 885 | 255 | 1500 |
| IX-7 | — | 280 | 860 | 282 | 1560 |
| IX-9 | 10.6 | 270 | 760 | 265 | 1360 |
| IX-12 | 0.4 | 1122 | 2270 | 216 | — |

[a]ASTM D-412, C-die, 2 in/min crosshead rate.
[b]Toughness, in psi, is integral of area under curve, i.e., in-lb/in$^3$ = lb/in$^2$

TABLE 8
MECHANICAL PROPERTIES OF REMOLDED SAMPLES[a]

| EXAMPLE | $\sigma_y$ (psi) | $\sigma_b$ (psi) | $\epsilon_b$ (%) | TOUGHNESS (psi) |
|---|---|---|---|---|
| IX-6 | 345 | 1256[b] | 296[b] | 2125[b] |
| IX-9 | 361 | 1095 | 265 | 1796 |
| IX-12 | 1905 | 2384[b] | 90[b] | 1876[b] |

[a] ASTM D-412, C-die, 2 in/min crosshead rate.
[b] One sample tested only.

TABLE 9
POLYOLEFIN COMPOSITES

| EXAMPLE | REAGENTS | TiCl₃ (mg) | 1-BUTENE (g) | MAXIMUM TEMP (°C.) | TIME UNTIL PEAK TEMP (min) | MAX PRESSURE (psi) | WT OF PRODUCT (g) | WT % FILLER |
|---|---|---|---|---|---|---|---|---|
| X-1 | 10[a] DEAC + 7.0 g 60 H Mica | 244 | 32.4 | 162 | 27 | 315 | 32.4 | 22 |
| X-2 | 10[a] DEAC + 7.66 g Bentonite | 235 | 24.7 | 27 | 180 | 210 | 24.0 | 32 |
| X-3 | 10[a] DEAC + 3.5 g 60 H Mica | 226 | 27.9 | 157 | 35 | 300 | 29.0 | 12 |
| X-4 | 10[a] DEAC + 3.84 g Bentonite | 236 | 33.6 | 143 | 79 | 290 | 34.1 | 11 |
| X-5 | 5[a] TEA + 3.5 g 60 H Mica | 221 | 32.8 | 123 | 3 | 480+ | 28.6 | 12 |
| X-6 | 5[a] TEA + 3.89 g Bentonite | 235 | 31.3 | 115 | 3 | 340 | 31.5 | 12 |

[a] Number is moles of aluminum cocatalyst per mole of Ti.

TABLE 10
PROPYLENE HOMOPOLYMERIZATION

| EXAMPLE | TiCl₄ (mg) | TiCl₃ (mg) | VCl₃ (mg) | VCl₄ (mg) | DEAC:Ti (MOLAR) | TEA:Ti (MOLAR) | TEA (mg) | PROPYLENE (g) | PRODUCT (g) |
|---|---|---|---|---|---|---|---|---|---|
| XIV-1 | | 217 | | | 7 | | | 13.0 | 10.9 |
| XIV-2 | | 249 | | | 7 | | | 51.9 | 43.3 |
| XIV-3 | | 58 | | | 14 | | | 27.1 | 17.9 |
| XIV-4 | | 54 | | | | 14 | 560 | 36.0 | 30.0 |
| XIV-5 | | 253 | | | | 7 | 1300 | 20.2 | 17.3 |
| XIV-6 | | 200 | | | | 7 | 1040 | 34.7 | 28.8 |
| XIV-7 | | 198 | | | | 7 | 1030 | 50.5 | 40.6 |
| XIV-8 | 100 | | | | | 7 | 420 | 34.6 | 0.7 |
| XIV-9 | 100 | | | | | 14 | 840 | 35.4 | 13.4 |
| XIV-10 | | | 250 | | | 7 | 1270 | 31.3 | 24.5 |
| XIV-11 | | | | 250 | | 7 | 1040 | 28.4 | 26.4 |
| XIV-12 | | 125 | | 125 | | 7 | 668 | 30.9 | 29.8 |
| XIV-13 | | 200 | | 50 | | 4.5 | 668 | 34.0 | 15.8 |
| XIV-14 | | 25 | | | | 7 | 134 | 31.1 | 25.6 |
| XIV-15 | | | 200 | 50 | | | 1000 | 33.4 | 20.7 |
| XIV-16 | | | 50 | | | 7 | 251 | 28.7 | 11.7 |

| EXAMPLE | TEMPERATURE OF EXOTHERM (°C.) | TIME OF EXOTHERM (MINUTES) | PRESSURE AT PEAK TEMPERATURE (psi) | STARTING PRESSURE (psi) | CONVERSION WT OF PRODUCT / WT OF FEED |
|---|---|---|---|---|---|
| XIV-1 | 33 | 71 | 300 | 250 | 83.8 |
| XIV-2 | 146 | 115 | 600 | 250 | 83.4 |
| XIV-3 | 24 | 1 | 600 | 600 | 66.1 |
| XIV-4 | 83 | 22 | 750 | 600 | 83.3 |
| XIV-5 | 78 | 2 | 570 | 475 | 85.6 |
| XIV-6 | 118 | 4 | 700 | 600 | 83.0 |
| XIV-7 | 120 | 10 | 550 | 200 | 80.4 |
| XIV-8 | 28 | 0.1 | 600 | 600 | 2.0 |
| XIV-9 | 24 | — | 250 | 250 | 37.9 |
| XIV-10 | 22 | — | 250 | 250 | 78.3 |

TABLE 10-continued

PROPYLENE HOMOPOLYMERIZATION

| | | | | | |
|---|---|---|---|---|---|
| XIV-11 | 81 | 16 | 300 | 250 | 93.0 |
| XIV-12 | 107 | 3.4 | 300 | 250 | 96.4 |
| XIV-13 | 105 | 3.0 | 300 | 250 | 46.5 |
| XIV-14 | 95 | 74 | 250 | 250 | 82.3 |
| XIV-15 | 25 | — | 250 | 250 | 62.0 |
| XIV-16 | 32 | 8 Hrs. | 250 | 250 | 40.8 |

TABLE 11

1-BUTENE POLYMERIZATION

| EXAMPLE | REAGENTS (MOLE RATIO PER TiCl₃) | 1-BUTENE (g) | TEMPERATURE (°C.) | WHOLE POLYMER GPC | | | | ETHER EXTRACT GPC | | | | WT OF PRODUCT (g) |
|---|---|---|---|---|---|---|---|---|---|---|---|---|
| | | | | $\bar{M}_n$ | $\bar{M}_w \times 10^3$ | $\bar{M}_z \times 10^3$ | O | $\bar{M}_n$ | $\bar{M}_w \times 10^3$ | $\bar{M}_z \times 10^3$ | O | |
| XIV-17 | 7 TEA, 10 grams 4 Vinylcyclohexene | 20.4 | 57 | 69,600 | 1,930 | 5,500 | 27.74 | 15,500 | 140 | 788 | 9.04 | 23.2 |
| XIV-18 | 7 TEA, 1 Piperidine | 29.3 | 76 | 39,800 | 1,090 | 4,630 | 27.19 | 12,300 | 177 | 1240 | 14.49 | 22.9 |
| XIV-19 | 7 TEA, 3 Piperidine | 24.9 | 36 | 32,200 | 945 | 3,370 | 29.38 | 12,300 | 149 | 828 | 12.13 | 25.8 |
| XIV-20 | 7 TEA, 0.01 2,2,6,6 Tetramethylpiperidine | 32.2 | 58 | 44,400 | 840 | 3,550 | 18.81 | | | | | 23.0 |
| XIV-21 | 7 TEA, 0.1 2,2,6,6 Tetramethylpiperidine | 29.7 | 73 | 37,600 | 982 | 4,070 | 26.07 | | | | | 26.8 |

TABLE 12

FORMED COMPOSITES

| EXAMPLE | REAGENTS/MOLE RATIO TiCl₃ FILLER (g) | 1-BUTENE (g) | MAX TEMP °C. | MAX PRESSURE (psig) | MINUTES TO EXOTHERM | WT OF PRODUCT (g) | DENSITY |
|---|---|---|---|---|---|---|---|
| XV-1 | 10 TEA | 26.8 | 123 | 300 | 1.3 | 37.2 | 0.6 |
| XV-2 | 10 DEAC | 24.5 | 121 | 260 | 23 | 15.8 | 0.6 |
| XV-3 | 15 DEAC + 1 g Cabosil (M-5) + 16 g 60H Mica | 34.4 | 70 | 250 | 20 | 40.5 | 0.58 |
| XV-4 | 15 DEAC + 1.0 g Cabosil (M-5) | 29.6 | 105 | 280 | 19 | 27.2 | 0.46 |
| XV-5 | 15 DEAC + 3.0 g Cabosil (M-5) | 31.2 | 117 | 240 | 13 | 23.2 | 0.64 |
| XV-6 | 15 DEAC + 1 g Cabosil (M-5) | 39.2 | 148 | 320 | 14 | 26.4 | 0.24 |
| XV-7 | 15 DEAC + 1 g Cabosil (M-5) | 30.0 | 114 | 300 | 13 | 21.2 | 0.4 |
| XV-8 | 15 DEAC + 1 g Cabosil (M-5) | 25.5 | 122 | 240 | 15 | 17.4 | 0.45 |

What is claimed is:

1. A method for producing an olefin polymer article which comprises substantially completely polymerizing an olefinic monomer feed selected from the group consisting of ethylene, C₃ to C₁₂ aliphatic and cycloaliphatic alpha monoolefins, and mixtures thereof in contact with a coordination catalyst in a mold having the shape of the article, at conditions under which the polymer is produced as a coherent, useful article in the shape of the interior of the mold.

2. A method for producing an olefin polymer article which comprises charging a fluid olefinic monomer feed selected from the group consisting of ethylene, C₃ to C₁₂ aliphatic and cycloaliphatic alpha monoolefins, and mixtures thereof under pressure, and a coordination catalyst, to a pressure-tight mold; retaining the mixture in the mold in liquid or supercritical phase at polymerization conditions conducive to formation of a cohesive mass of polymer; and supplying at least additional monomer as the polymerization proceeds until conversion of monomer to a polymer mass which fills the mold is substantially complete.

3. A method for producing an olefin polymer article which comprises filling a pressure-tight mold, which has at least one movable wall section, with a fluid olefinic monomer feed selected from the group consisting of ethylene, $C_3$ to $C_{12}$ aliphatic and cycloaliphatic alpha monoolefins, and mixtures thereof under pressure in liquid or supercritical phase and with a catalytic amount of a coordination catalyst, maintaining the mold at polymerization conditions while reducing the mold volume by inward movement of said movable wall section to compensate for shrinkage of the reaction mixture as polymerization proceeds, until the reaction mixture has been substantially completely converted to a coherent article in the shape of the mold, and removing the article from the mold.

4. A method for producing an olefin polymer article which comprises placing at least one constituent of a coordination catalyst in a pressure-tight mold having the shape of the article; charging a fluid monoolefinic feed selected from the group consisting of ethylene, $C_3$ to $C_{12}$ aliphatic and cycloaliphatic alpha monoolefins, and mixtures thereof under pressure, and any additional catalyst constituents required to produce an effective catalyst, to the mold; substantially completely polymerizing the feed at conditions under which the polymer is produced as a coherent, useful article in the shape of the interior of the mold; and removing the article from the mold.

5. The method of claims 1, 2, 3, or 4 wherein said olefinic feed is a single aliphatic α-olefin of from 2 to 16 carbon atoms per molecule.

6. The method of claims 1, 2, 3, or 4 wherein said olefinic feed is ethylene.

7. The method of claims 1, 2, 3, or 4 wherein said olefinic feed is propylene.

8. The method of claims 1, 2, 3, or 4 wherein said olefinic feed is butene-1.

9. The method of claims 1, 2, 3, or 4 wherein said olefinic feed is a mixture of at least two α-monoolefins.

10. The method according to claims 1, 2, or 3 wherein said catalyst comprises a procatalyst and a cocatalyst, and wherein said olefinic feed is at least initially charged to the mold in at least two separate streams, one of which contains the procatalyst component and the other the cocatalyst component of the catalyst, in predetermined proportions to provide an effective polymerization catalyst when combined.

11. The method according to claim 10 wherein said feed streams are combined and intensively mixed in a mixing zone upstream from the mold.

12. The method according to claim 10 wherein said catalyst components are a catalytically active titanium halide composition and an effective aluminum alkyl cocatalyst, respectively; feed and catalyst components are combined while at a first temperature in the range from 0° to 150° C.; and the reaction mixture is maintained at a second temperature in the range from 0° C. to 200° C. until the reaction is complete.

13. The method according to claim 12 wherein the olefin in said feed is propylene, and said second temperature range is from 60° to 170° C.

14. The method according to claim 13 wherein said propylene is charged in liquid phase at a temperature below 90° C.

15. The method according to claim 10 wherein the olefin in said feed is 1-butene; said catalyst components are a catalytically active titanium halide composition and an effective aluminum alkyl cocatalyst, respectively; feed and catalyst components are combined while at a first temperature in the range from 0° to 90° C.; and the reaction mixture is maintained at a second temperature in the range from 0° to 120° C. until the reaction is complete.

16. The method according to claim 15 wherein the reaction temperature does not exceed 90° C. and the article, as removed from the mold, is in crystal form I.

17. The method according to claim 12 wherein said catalyst components are, respectively, a solid composition consisting essentially of titanium chloride, magnesium chloride and an aromatic ester electron donor; and an aluminum trialkyl having 2–8 carbon atoms per alkyl group; and wherein an aromatic ester is added as selectivity control agent, either combined with the feed stream containing the cocatalyst or in as a third stream in a portion of monomer feed.

18. The method according to claims 1, 2, 3, or 4 wherein a particulate or reticulate reinforcing or filler composition is present in the mold prior to injection of the reactive feed.

19. The method according to claims 1, 2, 3, or 4 wherein a particulate reinforcing or filler composition is charged to the mold in at least one monomer feed stream.

20. The method according to claims 1, 2, 3, or 4 wherein one or more additives selected from the group consisting of antioxidants, stabilizers against actinic radiation, pigments, plasticizers, mold release agents, flame retardants and impact modifiers are present in the mold prior to addition of feed or are added in suspension as solution in a feed stream.

21. A method for producing a cellular olefin polymer article which comprises charging a fluid olefinic monomer feed selected from the group consisting of ethylene, $C_3$ to $C_{12}$ aliphatic and cycloaliphatic alpha monoolefins, and mixtures thereof under pressure, and a coordination catalyst, to a pressure-tight mold; retaining the mixture in the mold in liquid phase at polymerization conditions conducive to formation of a cohesive mass of polymer; supplying at least additional monomer as the polymerization proceeds until conversion of monomer to a polymer mass which fills the mold is partially complete, quickly reducing pressure in the mold to cover the liquid polymer to foam, and containing polymerization in the mold to substantial completion.

22. The method according to claim 21 wherein a finely divided foam nucleating solid is placed in the mold prior to introduction of feed.

23. The method according to claim 21 wherein a finely divided foam nucleating solid is present in the feed charged to the mold.

* * * * *